United States Patent Office 3,829,531
Patented Aug. 13, 1974

---

3,829,531
ADDITIVE FOR IMPACT MODIFIED THERMOPLASTICS
Robert Martin Graff, Cornwells Heights, Pa., assignor to Rohm and Haas Company, Philadelphia, Pa.
No Drawing. Filed Jan. 8, 1973, Ser. No. 321,600
Int. Cl. C08g 41/04
U.S. Cl. 260—859      12 Claims

ABSTRACT OF THE DISCLOSURE

Thermoplastic articles having greatly reduced susceptibility to hazing are prepared from a solution of a polyurethane impact modifier in an $\alpha,\beta$-unsaturated monomer comprising methyl methacrylate, and a haze modifier copolymer.

---

This invention relates to impact-modified thermoplastic articles, to compositions from which such articles are prepared, and to methods of preparing such articles.

The use of urethane polymers to improve the impact resistance of thermoplastic polymers is a recent development which has made available transparent sheet and other articles which have great advantages over earlier thermoplastics in that they can be employed in many additional environments wherein breakage-resistance is a desirable property. The compositions and articles disclosed in Niederhauser et al. U.S. Pat. 3,640,199 can be employed in many uses, such as unbreakable windows, and even bullet-resistant bank teller protection. Although the refractive indices of the urethane impact modifier and the thermoplastic polymer can be adjusted so as to provide clear articles, the refractive index matching is temperature-dependent in that the impact modifier and the thermoplastic polymer change refractive indices at different rates with changing temperature. Thus, the article may be perfectly clear at room temperature but may become hazed at 32° F. or 100° F.

A similar effect results from differential water vapor adsorption, causing different refractive index variations in environments of changing water content, so refractive indices which are matched at one humidity may haze at a different humidity.

While the Niederhauser et al. compositions having low viscosity are suited for the well-known cell casting method of forming thermoplastic sheet, the newly developed continuous casting method requires polymerizable compositions having high viscosity.

It is therefore an object of the invention to provide impact-modified thermoplastic articles which are resistant to haze at varying temperature and humidity environments. It is a further object to provide polymerizable compositions for preparing transparent, impact-resistant thermoplastic articles substantially free of temperature and humidity hazing. A still further object is to provide an improved method of continuously casting impact resistant transparent thermoplastic sheet.

These objects, and others which will become apparent from the following description, are achieved by this invention which comprises, in one aspect, a composition comprising a solution of a condensation product of an isocyanato-terminated polyurethane with a reactive hydrogen-containing monoethylenically unsaturated monomer in an $\alpha,\beta$-ethylenically unsaturated monomer comprising methyl methacrylate having included therein a copolymer of a $C_1$ to $C_4$ alkyl methacrylate and acrylic or methacrylic acid. In another aspect, the invention comprises the impact modified transparent thermoplastic articles having improved resistance to hazing comprising the polymerization product of the composition. In a further aspect, the invention comprises a process for casting impact-modified transparent acrylic sheet comprising controlling (increasing) the viscosity of a solution of a condensation product of an isocyanato-terminated polyurethane with a reactive hydrogen-containing monoethylenically unsaturated monomer in an $\alpha,\beta$-ethylenically unsaturated monomer comprising methyl methacrylate with a copolymer of a $C_1$ to $C_4$ alkyl methacrylate and acrylic or methacrylic acid as a viscosity control agent, continuously depositing the resultant polymerizable composition in a continuously moving mold comprising a moving pair of belts, passing said mold through one or more temperature zones wherein temperature is controlled so as to polymerize and cure said composition, and thereafter removing the resultant sheet from said mold.

U.S. Pat. 3,641,199 discloses compositions comprising a solution of condensation product of an isocyanato-terminated polyurethane with a reactive hydrogtn-containing monoethylenically unsaturated monomer in an $\alpha,\beta$-ethylenically unsaturated monomer comprising methyl methacrylate, and impact-resistant transparent thermoplastic articles polymerized from said compositions. The compositions disclosed therein are improved by this invention.

Suitable isocyanato-terminated polyurethanes used to prepare the impact modifier of the composition of this invention include the reaction products of a molar excess of organic diisocyanate compound or mixture thereof with at least one active hydrogen-containing material. An NCO/OH equivalents ratio of about 1.001:1 to about 2:1 is preferred.

Suitable diisocyanates include saturated or unsaturated aliphatic or alicyclic diisocyanates of the formula $$OCN—R—NCO$$

wherein R is an aliphatic or cycloaliphatic moiety. The diisocyanates can be substituted or unsubstituted but aromatic ring substituents are excluded. Exemplary diisocyanates include 1,6-hexane diisocyanate, 2,4,4-trimethyl-1,6-hexylene diisocyanate, isophorone diisocyanate, and the like. The preferred diisocyanate is bis(4-isocyanatocyclohexyl) methane.

Suitable active hydrogen containing materials for reaction with the diisocyanate to make the isocyanato-terminated polyurethane can be linear or branched or mixtures thereof and include materials having two or more active hydrogens as determined by the Zerewitinoff method per molecule, including monomeric polyols such as propylene glycol, glycerol, trimethylolpropane, pentaerythritol, dipentaerythritol, 1,4-butane diol, neopentyl glycol, 1,6-hexane diol, 1,4-cyclohexane diol and the like; aminoalcohols such as ethanolamine, and the like; mercaptoalcohols such as mercaptoethanol and the like; diamines such as ethylene diamine and the like; cycloaliphatic polyols, aminoalcohols, and polyamines, and the like. Condensation polymers having two or more active hydrogens are also very suitable, and include linear, branched, mixtures thereof, and mixtures with the previously mentioned monomeric materials. Polyester condensation polymers include condensation products of caprolactone or caprolactam and the like with either a difunctional initiator such as ethylene glycol and the like or a tri- or higher functional initiator such as glycerol, pentaerythritol, and the like; condensation products of di- or trifunctional alcohols such as ethylene glycol, propylene glycol, and the like, or mixtures thereof, with polycarboxylic acids such as adipic acid or mixtures thereof.

Polyether polyol condensation products are also suitable and can be any of the wide variety available. They are usually prepared by condensation of a polyol or polyamine with an alkylene oxide, for example, ethylene glycol, ethylene diamine, trimethylolpropane, etc., with ethylene oxide, propylene oxide, epichlorohydrin, and the like.

Varying the particular active hydrogen material mixture as to composition and ratio of components is a very suitable way of tailoring the refractive index of the impact modifier component.

The isocyanato-terminated polyurethane "prepolymer" is reacted with an active hydrogen containing ethylenically unsaturated monomer such as hydroxyethylmethacrylate [HEMA], hydroxypropylmethacrylate, hydroxybutyl methacrylate, hydroxymethylacrylate, hydroxybutyl acrylate, hydroxyethylvinyl sulfide, hydroxyethylvinyl ether, allyl alcohol, acrylic acid, methacrylic acid, t-butyl aminoethyl methacrylate, acrylamide, and the like. The amount employed is preferably at least sufficient to react with the remaining isocyanate functionality. Any excess of this monomer interpolymerizes with the MMA and any other monomer making up the $\alpha,\beta$-unsaturated monomer system which, when polymerized, becomes the thermoplastic polymer matrix. The monoethylenically unsaturated portion of the monomer which reacts with the isocyanate functionality of the polyurethane acts as a grafting site so that the urethane becomes grafted to the thermoplastic polymer matrix, improving the impact strength, resistance to stress whitening, modulus, and thermoformability.

The other component of the solution is an $\alpha,\beta$-unsaturated monomer. Preferably, the major portion of this component is methylmethacrylate. Optionally, up to about 45% of this component can be other monomers such as other esters of methacrylic acids, esters of acrylic acid, styrenes and substituted styrenes, vinyl esters, and the like, and polyfunctional monomers such as polyacrylated or polymethacrylated polyols such as tetraethylene glycol dimethacrylate, ethylene glycol dimethylacrylate, trimethylol propane trimethacrylate and the like; and other polyfunctional monomers such as divinylbenzene, and the like, and hydroxyalkyl esters of acrylic and methacrylic acid such as HEMA and hydroxyethyl acrylate.

Preferably, the impact modifier comprises about 1 to about 50 perecnt of the weight of the solution of impact modifier in $\alpha,\beta$-unsaturated monomers, more preferably about 5 to 30, and most preferably about 5 to 25 percent. Small amounts of free radical catalysts, parting (mold release) agents; polymerization control agents, UV stabilizers and thermal stabilizers are incorporated in the casting recipe. Fiber reinforcement, fillers, colorants, and other adjuvants can be used. The articles can be coated with an abrasion resistant coating.

While the impact modififier and the $\alpha,\beta$-unsaturated monomer form a solution when combined, upon polymerization and cure they form two phases, an elastomeric phase and a glassy phase. By adjusting the composition of the impact modifier and the $\alpha,\beta$-unsaturated monomer, it is possible to match the refractive indices of the two phases to obtain almost crystal clarity in the cured article; however, due to the fact that the elastomeric phase has a more rapid change in refractive index with variances in temperature and humidity than does the glassy or rigid phase, the two phases can become unmatched at temperatures or humidities different from the conditions at which the indices match. This problem can limit the utilities of such articles. Changes within the prior art framework to overcome this particular problem are limited by other factors, such as desired impact properties, and economic requirements.

It has been discovered that by incorporation of a small amount of a copolymer of a first member selected from the group consisting of $C_1$ to $C_4$ alkyl acrylates, methacrylates, and mixtures thereof, with a second member selected from the group consisting of acrylic acid, methacrylic acid, and mixtures thereof, and an optional third member selected from the group consisting of other copolymerizable monomers, the temperature and humidity hazing are greatly and surprisingly diminished. The preferred amounts of copolymer are about 0.1 to 20 percent by weight based on weight of the solution, more preferably about 2 to 10 percent, and most preferably 2.5 to 6 percent.

The copolymer has the multiple advantage of thermal and humidity haze reduction and control of mix viscosity, as well as improving weatherability. With cell casting processes, it is preferable that the copolymer be of minimum molecular weight necessary to maintain impact strength since too low molecular weight can adversely affect impact strength. A molecular weight as determined by measured intrinsic viscosity in $CH_2Cl_2$ of at least 0.10 is preferred, more preferably about 0.20. With continuous and rotational casting processes, it is preferred that the copolymer be of maximum molecular weight possible, with a molecular weight as determined by intrinsic viscosity in $CH_2Cl_2$ of at least about 0.50, with preferred viscosities about 0.90 to about 2.20.

The $C_1$ to $C_4$ methacrylate can be methyl, ethyl, propyl, isopropyl, n-butyl, isobutyl, or t-butyl methacrylate, with the former most preferred. The acid functional comonomer can be acrylic acid or methacrylic acid with the latter preferred. The ratio of methacrylate to acid is preferably about 99:1 to 80:20 by weight, with the most preferred 97:3 to 90:10.

The order of mixing the copolymer with the solution is completely optional. One suitable method is to dissolve or disperse the haze modifier in a portion of the $\alpha,\beta$-unsaturated monomer, and then blend with a solution of impact modifier in remainder of $\alpha,\beta$-unsaturated monomer.

Optical haze is defined as the ratio of the difference between total white light transmission and the white light transmission scattered at an angle of 2.5° or less to total white light transmission. The constant Q for a particular sample reflects susceptibility to temperature or humidity hazing. Where T is the temperature of measurement, $T_m$ is temperature at which haze is at a minimum, $H_m$ is percent haze at $T_m$, H is haze at temperature of measurement, $$Q = \frac{H - H_m}{(T - T_m)^2}.$$

A similar formula for humidity hazing, wherein R is relative humidity at humidity of measurement and $R_m$ is relative humidity where haze is at minimum, is assumedly $$Q_R = \frac{H - H_m}{(R - R_m)^2}.$$

Thermoplastic articles cast from recipes which include the acidic copolymer additives defined above have been found to exhibit significantly lower Q than the analogous recipe without the additive.

The thermoplastic articles cast from the compositions of the invention can be rods, sheets, spheres, tubes and the like. Casting methods include all bulk casting methods such as the cell cast method wherein the casting mix is introduced into a stationary, completely sealed "cell" and heated to the polymerization and cure temperature, the rotational casting method wherein spheres or tubes can be cast by rotating the mold while heating, and the continuous cast method wherein the casting mix is continuously deposited in a continuously moving mold comprising a moving pair of belts, with means on the side of the pair of belts to form a four sided mold, which is then continuously passed through one or more temperature zones wherein temperature is controlled so as to polymerize and cure the casting mix, and the resultant sheet is thereafter removed from the mold.

With the rotational and continuous casting methods, it is important to have a fairly high viscosity so as to control flow of the mix (recipe) within the mold. Preferred viscosities are about 2,500 to 50,000 cps. at 250° C. by the Brookfield method. The particular viscosity used depends upon the particular casting process and process conditions, and by varying the molecular weight and amount of the haze/viscosity modifier copolymer, the polymerizable composition can be readily adjusted to the optimum casting viscosity. A preferred viscosity range for continuous casting of sheet is about 3,000 to 7,000 cps. (25° C.), and for rotational casting about 20,000 to 40,000 cps. (25° C.). The acidic copolymer found beneficial for lowering Q has been found to be a very convenient means for adjusting the viscosity of a solution of a polyurethane impact modifier in a monomer system comprising methyl methacrylate to the desired viscosity for the continuous or rotational casting process.

The transparent thermoplastic articles of the invention have a very beneficial combination of properties, including very high impact strength, weatherability, and lack of susceptibility to hazing at varying temperature and humidity environments. Suitable uses for these articles are, for example, as a substitute for bullet-proof glass, for vandal-proof windows such as are desirable in schools, baseball backstops, aircraft canopies and windows, and many other utilities which should be quite apparent from the description of the properties and exemplary uses.

The following examples are presented to illustrate a few embodiments, but the invention should not be considered as limited thereto.

In the following examples, all proportions are by weight unless otherwise indicated. The following abbreviations for the following materials are used:

| | |
|---|---|
| HEMA | β-Hydroxyethyl methacrylate. |
| MMA | Methyl methacrylate. |
| EG/PG AD | Poly(ethylene glycol/propylene glycol [80/20[) adipate. |
| PCLD | Polycaprolactone diol. |
| BICHM | Bis(4-isocyanatocyclohexyl)methane. |
| DBTL | Dibutyltin dilaurate. |
| BHT | Butylated hydroxy toluene. |
| ETEMA | Ethylthioethyl methacrylate. |
| PCLT | Polycaprolactone triol. |
| MAA | Methacrylic acid. |
| AIBN | Azobis-isobutyronitrile. |
| n-DDM | n-Dodecyl mercaptan. |
| TBPO | t-Butyl peroctoate. |
| MDC | Methylene dichloride. |
| 1,4-BG | 1,4-butylene glycol. |
| 1,3-BG | 1,3-butylene glycol. |
| 1,3-BGDMA | 1,3-BG dimethacrylate. |
| t-BPOPV | t-Butylperoxypivalate. |

EXAMPLE I

This example illustrates preparation of an isocyanato-terminated polyurethane, and a condensation product thereof with a reactive hydrogen-containing ethylenically unsaturated monomer (HEMA), and a solution of the condensation product in MMA.

308.7 parts of BICHM (2.346 equivalents), 967.0 parts EG/PG AD (1.00 eqs.) 38.07 parts 1,3-BG (0.845 eqs.), 16.58 parts 1,4-BG (0.368 eqs.) and 0.6 parts stannous octoate catalyst are introduced in a flask at 50° C. with 261 ml. of MMA solvent and stirred. After 9 hours, 750 ml. MMA is added. The equivalent weight by isocyanate titration is 10,000. Then 120.0 parts HEMA (0.138 eqs. plus excess) and 0.6 parts stannous octoate are added. The reaction is carried to completion and after 3.5 hours at 50° C., the solids content in MMA is 48.6%.

EXAMPLE II

This example illustrates preparation of an isocyanato-terminated polyurethane from hydroxy-terminated condensation polymers, and condensation product of the polyurethane with a reactive hydrogen containing unsaturated monomer (HEMA), and a solution thereof in α,β-unsaturated monomer (MMA).

290.8 parts (0.7000 eq.) of PCLD having a hydroxyl number of 135 and an acid number of 0.02, 5.25 parts (0.0292 eq.) of PCLT having an hydroxyl number of 312 and an acid number of 0.002, 103.6 parts BICHM (0.7875 eq.), 1 part DBTL catalyst, 0.16 part BHT inhibitor, 0.2 part ETEMA thermal stabilizer, and 932.7 parts MMA solvent are introduced to a flask. The reaction is completed by raising the temperature to 60° C. until the equivalent weight measured by NCO titration based on solids is 19,417 and the Gardner-Holdt viscosity at 17% solids in MMA at 25° C. is V+. Then 12.21 parts HEMA (0.094 eqs.) or 3.315% on a weight basis of the isocyanato-terminated polyurethane, and 361.4 parts additional MMA solvent are added. The reaction is completed at 60° C. The equivalent weight of the resulting impact modifier is ∞ and the viscosity at 17.0% solids in MMA of 25° C. is W-.

EXAMPLE III

This example illustrates preparation of the haze/viscosity modifier copolymer, and continuously casting impact modified thermoplastic sheet.

A. 360 parts MAA, 5640 parts MMA, 0.12 parts AIBN and 0.18 parts TBPO as free radical initiators and 1.5 parts n-DDM as chain transfer agent were mixed and heated for 76 hours at 66° C. and at 80° C. for 2 hours in a suitable mold. The copolymer was a solid and was granulated after removal of the mold. The copolymer had a residual MMA content of 9.5% and estimated intrinsic viscosity in MDC of 1.1 dl./g.

B. 5889 parts MMA (58.89 eqs.), 2,6-di-t-butyl cresol/(0.0084 eqs.), 183.65 parts EG/PG AD/(29.38 eqs.), 23 parts 1,4-BG/(0.511 eqs.), 55.8 parts 1,3-BG (1.24 eqs.), 20.46 parts stannous octoate (.0508 eqs.), and 438.8 parts BICHM are introduced in a flask at 50° C. and stirred 22.25 hours until the equivalent weight is 47,000. Then 267 parts HEMA (2.05 eqs.) are added and the reaction continued 8 hours. Then 7570 parts MMA added, mixture cooled to room temperature. The Gardner-Holdt viscosity of a 20% solution of the condensation product in MMA is J-.

C. To prepare the casting recipe, 950 parts of the copolymer are mixed with 17,628 parts of a 23.4% weight solution of impact modifier prepared in B in MMA, 0.25 parts oxalic acid, 25 parts substituted benzotriazole UV stabilizer, and 5,810 parts MMA monomer, stirred 3.5 hours at 65–80° C., cooled to 25° C. and stirred 16 hours, 1362 parts evaporated MMA replaced, 375 parts styrene, and 150 parts 1,3-BGDMA additional α,β-unsaturated monomers, 7.5 parts sodium octyl sulfosuccinate (parting agent), and 2.5 parts lecithin (parting agent) added. The casting recipe contained 16.5 wt. percent impact modifier and 3.8 wt. percent haze/viscosity modifier. The recipe had a Brookfield viscosity of 5,190 cps. at 26° C. using spindle No. 3 and averaging 6 and 12 r.p.m. The recipe was initiated with 0.175 parts per 100 parts recipe of a 75% solution of t-BPOPV in mineral spirits and 0.03 parts per 100 recipe of AIBN, and introduced at the nip of a pair of stainless steel belts moving at the linear rate of 1.85 feet per minute which passed through the following temperature zones for 5.4 minutes each: 91° C., 84° C., 83° C., 143° C., and 76° C., and then removed at the opposite end. The resultant sheet was transparent, clear, having a haze versus temperature constant Q of 0.0227, and impact strength of 1.64 inch-pounds, a microtensile modulus of $2.0 \times 10^5$ p.s.i., and minimum haze of 2.05%.

With the haze/viscosity modifier deleted, the Brookfield viscosity of the recipe was 80 cps, which is much too low to introduce in the continuous casting apparatus.

EXAMPLE IV

This example illustrates preparation of a lower molecular weight haze modifier, and its use in a cell cast process to prepare a transparent impact-modified thermoplastic sheet.

A. 360 parts MAA, 5640 parts MMA, 0.12 parts AIBN, 0.18 parts TBPO and 1.5 parts n-DDM were mixed and heated in a mold at 66° C. for 76 hours and 80° C. for 2 hours, and the resultant copolymer granulated. It had residual MMA content of 7.2% and estimated intrinsic viscosity in MDC of 0.20 dl./g.

B. An impact modifier was prepared as in Example IIIB.

C. A casting recipe was then prepared by mixing 12 parts of the copolymer, 325 parts impact modifier prepared in accordance with B, 56 parts MMA, 4 parts styrene, 2.4 parts 1,3-BGDM, 0.2 parts t-butyl peracetate, 75% in benzene, as free radical initiator, 0.04 parts t-BPOPV as free radical initiator (75% in mineral spirits), 0.02 parts acetyl peroxide, 0.02 parts sodium octyl sulfosuccinate, and 0.02 parts lecithin.

The recipe was poured into a mold consisting of two glass plates separated by a compressable gasket designed to give a finished sheet 0.250" thick, heated under a pressure of about 45 p.s.i. at temperatures ranging gradually increasing from 50° C. to 130° C. for 4 hours and removed from the mold.

The Izod impact strength was 1.96 ft.-lbs., microtensile modulus of $2.5 \times 10^5$ p.s.i., minimum haze of 0.9%, and a Q of 0.0377. A sheet cast from the same recipe except deleting the haze modifier copolymer had a Q of 0.0702, an impact strength of 2.22 ft.-lbs. microtensile modulus of $2.3 \times 10^5$ p.s.i. and minimum haze of 1.4%.

EXAMPLE V

This example illustrates a rotationally cast transparent thermoplastic cylinder.

A. An impact modifier is prepared by mixing 480 parts of MMA, 0.0084 part of 2,6-di-t-butyl cresol, 114.8 parts of polycaprolactone diol (401.86 g./eq.), 35.71 parts of polycaprolactone diol (415.55 g./eq.), 0.277 part of polycaprolactone triol (179.8 g./eq.), 0.0533 part of dibutyltin dilaurate, 5.4 parts of BICHM and heating the mixture to 60° C. for 28 hours when 0.409 part of polycaprolactone diol, 0.00076 part of polycaprolactone triol, and 0.1 part of MMA were added. (The equivalent weight was 16,900 g./eq. and the 17% Gardner-Holdt viscosity in MMA was U-). The reaction was continued for 16 hours at which time the equivalent weight was 21,800 g./eq. and the 17% Gardner-Holdt viscosity in MMA was Y-, and 0.638 part of HEMA was added. The reaction was continued for 26.5 hours, and the resulting equivalent weight was 133,300. Then 0.0053 part of dibutyltin dilaurate and 0.042 part of MMA were added. The reaction was continued for 8 hours, and 20.3 parts of MMA were added and the reaction was cooled to room temperature. The final solution solids was 23.1% in MMA, and the final Brookfield viscosity was 12,200 cps.

B. A viscosity/haze modifier is prepared by introducing 4,950 parts deionized water, 19.5 parts of a 50% solution of sodium octyl sulfosuccinate in ethanol, 1.63 parts potassium carbonate in an emulsion kettle at 50° C.; and then introducing in two parts a feed mixture of 4334 parts deionized water, 7776 parts MMA, 324 parts MAA and 61.5 parts of a 50% solution of sodium octyl sulfosuccinate in ethanol. First, a 750 part charge of the feed mixture is introduced, after which the mixture is heated to 69° C. in 24 minutes and then 0.25 parts potassium persulfate in 25 parts water added, and then, after the temperature rises to 77° C., the remainder of the feed mixture is added gradually along with 3.0 parts potassium persulfate in 297 parts deionized water at 84–86° C. After cooling to 25° C., the emulsion is spray dryed to a free flowing powder.

C. 2,087 parts impact modifier, 141 parts haze/viscosity modifier, 45 parts styrene, 9.0 parts 1,3-BGDMA, 3.0 parts substituted benzotriazole UV stabilizer, 0.45 parts lecithin, and 661.4 parts MMA were rolled in a vessel for 16 hours at 25° C. to achieve a uniform solution. 75 parts of the recipe were initiated with 0.113 parts bis(4,4'-t-butyl cyclohexyl)peroxydicarbonate and 0.0375 parts acetyl peroxide (25% solution in dibutyl phthalate).

The resultant Brookfield viscosity at 25° C. was 22,450 cps., spindle No. 4, average of 6 and 12 r.p.m. The recipe was charged to a cylindrical vessel which rotated about its axis at 150–180 r.p.m. for 1 hour at 61° C., then at 110° C. for about 1 hour, then cooled to room temperature. A 1/8" thick clear thermoplastic cylinder having an impact strength of 40–50 inch-pounds was produced which remained clear at 32° F. and 100° F. Without the viscosity modifier, the viscosity of the solution was 820 cps. and would not form a uniform layer in the rotational mold at these speeds.

EXAMPLE VI

This example illustrates the comparative properties of casting mixes having a haze/viscosity modifier, a haze only modifier (both in accordance with this invention) and no haze modifier (comparative).

A. A haze/viscosity modifier was prepared by heating 4950 parts deionized water, 19.5 parts of a 50% mixture of sodium octyl sulfosuccinate in ethanol (Complimix 50), and 1.63 parts potassium carbonate at 50° C. for 33 minutes, then introducing gradually a mixture of 4334 parts deionized water, 7614 parts MMA, 486 parts MAA, 40.5 parts n-DDM, and 61.5 parts Complimix 50, then adding 3.0 parts of potassium persulfate and 297 parts deionized water, cooling and spray drying to a free flowing powder.

B. A haze modifier according to A was prepared but deleting the n-DDM.

C. Using 82.2 parts of the impact modifier of Example VIIB, 48.8 parts MMA, and the 4.05 parts of modifiers of A and B in separate experiments, the recipe with A had a Brookfield viscosity at 25° C. of 8360, while the viscosity of the recipe with B was 906, and the recipe having 4 parts additional MMA in place of the haze modifier had a viscosity of 490.

EXAMPLE VII

This example illustrates another embodiment of the invention.

A. A haze/viscosity modifier was prepared in accordance with Example VIA except the MAA content was reduced from 6 to 3.75% and the MMA content was increased from 93.5 to 96.75%, and the n-dodecyl mercaptan deleted. The intrinsic viscosity of the spray dried powder in MDC was 1.95 dl./g.

B. An impact modifier was prepared in accordance with Example II except the equivalent weight before addition of HEMA was 21,800, and a 17% solution in MMA had a Gardner-Holdt viscosity at 25° C. of Y-.

C. 1543.5 parts of the impact modifier prepared in B, 65 parts of the haze viscosity modifier prepared in A, 37.5 parts of styrene, 7.5 parts of 1.3 butylene glycol dimethacrylate, 12.5 parts of UV stabilizer, 0.375 parts of parting agent, and 833.6 parts of MMA were mixed to give a clear solution (Brookfield viscosity 4040 cps., average of 6 and 12 r.p.m., spindle No. 3, 25° C.).

D. 215 parts of this mix was initiated with 0.22 parts of a 75% solution of t-butyl peroxypivalate in mineral spirits, 0.32 parts of a 75% solution of bis(2-ethyl hexyl) peroxydicarbonate in mineral spirits and 0.065 parts of azobisisobutronitrile; degassed for one minute under vacuum, and used to fill a mold which consisted of two stainless steel plates separated by a compressible gasket. The mold was vented of gas bubbles and heated under pressure of 45 p.s.i. for 21 minutes at 90° C. and 5 minutes at 130° C. The resulting 0.125 thick sheet had a notched Izod impact strength of 1.0 ft.-lbs. and a microtensile modulus of $2.8 \times 10^5$ p.s.i., a haze vs. temperature coefficient (Q) of 0.0027, and a minimum haze value of 0.8%.

I claim:

1. In a composition comprising a solution of a condensation product of an isocyanato-terminated polyurethane with a reactive hydrogen-containing monoethylenically unsaturated monomer in an α,β-ethylenically unsaturated monomer comprising methyl methacrylate; the improvement comprising the inclusion of from 0.1 to 20 percent by weight based on said solution of a copolymer of a first member selected from the group consisting of about 80 to 99 parts by weight of $C_1$ to $C_4$ alkyl acrylates, methacrylates, and mixtures thereof, with a second member selected from the group consisting of about 20 to 1 parts by weight of acrylic acid, methacrylic acid, and mixtures thereof, and an optional third member selected from the group consisting of other copolymerizable monomers.

2. The composition of claim 1 wherein said copolymer is polymerized from a monomer mixture comprising about 80 to 99 parts by weight methyl methacrylate and about 20 to 1 parts by weight methacrylic acid.

3. The composition of claim 2 wherein the intrinsic viscosity of the copolymer in methylene chloride is at least about 0.10.

4. The composition of claim 2 wherein the intrinsic viscosity of the copolymer in methylene chloride is about 0.90 to about 2.20.

5. A process for casting impact-modified acrylic sheet comprising adjusting the viscosity of a solution of a condensation product of an isocyanato-terminated polyurethane and a reactive hydrogen-containing monoethylenically unsaturated monomer in an $\alpha,\beta$-ethylenically unsaturated monomer comprising methylmethacrylate by inclusion of from 0.1 to 20 percent by weight based on said solution of a copolymer of a first member selected from the group consisting of about 80 to 99 parts by weight of $C_1$ to $C_4$ alkyl acrylates, methacrylates, and mixtures thereof, with a second member selected from the group consisting of about 20 to 1 parts by weight of acrylic acid, methacrylic acid, and mixtures thereof, and an optional third member selected from the group consisting of other copolymerizable monomers, continuously depositing the resultant viscosity adjusted polymerizable composition in a continuously moving mold comprising a moving pair of belts, passing said mold through one or more temperature zones wherein temperature is controlled so as to polymerize and cure said composition, and thereafter removing the resultant sheet from said mold.

6. The process of claim 5 wherein the viscosity of the polymerizable composition is adjusted to about 2500 to 50,000 cps. at 25° C. by Brookfield method.

7. The process of claim 5 wherein the viscosity is adjusted to about 3000 to 7000 cps. at 25° C.

8. An impact modified thermoplastic sheet having improved resistance to hazing comprising the product of the process of claim 5.

9. A process for rotationally casting spherical or cylindrical impact-modified thermoplastic articles having improved resistance to haze comprising adjusting the viscosity of a solution of a condensation product of an isocyanato-terminated polyurethane and a reactive hydrogen-containing monoethylenically unsaturated monomer in an $\alpha,\beta$-ethylenically unsaturated monomer comprising methylmethacrylate by inclusion of from 0.1 to 20 percent by weight based on said solution of a copolymer of a first member selected from the group consisting of about 80 to 99 parts by weight of $C_1$ to $C_4$ alkyl acrylates, methacrylates, and mixtures thereof, with a second member selected from the group consisting of about 20 to 1 part by weight of acrylic acid, methacrylic acid, and mixtures thereof, and an optional third member selected from the group consisting of other copolymerizable monomers, introducing said viscosity adjusted polymerizable composition to a rotating mold, rotating said mold while heating to effect polymerization, and thereafter removing the resultant article from the mold.

10. The process of claim 9 wherein the viscosity is adjusted to about 20,000 to 40,000 cps. at 25° C.

11. The spherical or cylindrical articles produced by the process of claim 9.

12. An impact modified thermoplastic article having improved resistance to hazing comprising the polymerization product of a composition comprising a solution of a condensation product of an isocyanato-terminated polyurethane with a reactive hydrogen-containing monoethylenically unsaturated monomer in an $\alpha,\beta$-ethylenically unsaturated monomer comprising methyl methacrylate and about 0.1 to 20 weight percent, based on solution, of a copolymer of a first member selected from the group consisting of about 80 to 99 parts by weight of $C_1$ to $C_4$ alkyl acrylates, methacrylates, and mixtures thereof, with a second member selected from the group consisting of about 20 to 1 parts by weight of acrylic acid, methacrylic acid, and mixtures thereof, and an optional third member selected from the group consisting of other copolymerizable monomers.

References Cited

UNITED STATES PATENTS

| | | | |
|---|---|---|---|
| 3,509,234 | 4/1970 | Burlant | 260—859 |
| 3,531,364 | 9/1970 | Schmidle | 260—859 |
| 3,532,652 | 10/1970 | Zang | 260—859 |
| 3,632,796 | 1/1972 | Holicky | 260—859 |
| 3,641,199 | 2/1972 | Niederhauser | 260—859 |
| 3,719,638 | 3/1973 | Huemmer | 260—859 |

PAUL LIEBERMAN, Primary Examiner.

U.S. Cl. X.R.

260—77.5 CR; 264—216, 310